United States Patent [19]

Tsukahara et al.

[11] Patent Number: 5,655,163

[45] Date of Patent: Aug. 5, 1997

[54] ILLUMINATED DISPLAY DEVICE WHICH CONTINUES ILLUMINATION UNTIL END OF OPERATING MODE

[75] Inventors: Daiki Tsukahara, Tokyo; Hiroshi Wakabayashi, Yokohama, both of Japan

[73] Assignee: Nikon Corporation, Tokyo, Japan

[21] Appl. No.: 518,398

[22] Filed: Aug. 15, 1995

[30] Foreign Application Priority Data

Oct. 18, 1994 [JP] Japan .................... 6-252081

[51] Int. Cl.⁶ ............................................. G03B 17/18
[52] U.S. Cl. ............................................. 396/287
[58] Field of Search ............................ 354/471–475, 354/289; 396/287

[56] References Cited

U.S. PATENT DOCUMENTS

| 4,142,786 | 3/1979 | Suzuki et al. ................ 354/32 |
| 5,432,578 | 7/1995 | Suzuki .......................... 354/289.12 |

FOREIGN PATENT DOCUMENTS 62-147440 of 1987 Japan .

*Primary Examiner*—Safet Metjahic
*Assistant Examiner*—Eric Nelson

[57] ABSTRACT

A camera display device includes a display unit which is selectively illuminated during camera operation. The display unit displays information to the photographer such as photometry and rangefinding information. A mode selector switch selects a camera operating mode from a plurality of operating modes and a camera instruction unit outputs an illumination instruction to an illumination light to thereby illuminate the display unit. A timer determines a time period for illumination of the display unit while a control unit continues the illumination of the display unit during a predetermined continuation time period in response to the illumination instruction from the camera instruction unit. The control unit also continues the illumination of the display unit until an end of the camera operating mode selected by the mode selector switch. The operating mode selected by the mode selector switch includes a long exposure mode which continues an exposure longer than the predetermined time of the illumination continuation unit, a bulb exposure mode which continues an exposure for a predetermined period of time beginning from the receipt of a signal from a camera release member, and a time exposure mode which continues an exposure for a predetermined period of time beginning from the receipt of a signal from the camera release member.

21 Claims, 3 Drawing Sheets

ILLUMINATED DISPLAY DEVICE WHICH CONTINUES ILLUMINATION UNTIL END OF OPERATING MODE

BACKGROUND OF THE INVENTION

1. Field of the Invention

The present invention relates to a display device having an illumination function and, more particularly, to a camera display device which continues the illumination function until the end of a camera operating mode.

2. Description of the Related Art

Conventional cameras routinely incorporate display devices which may be illuminated to convey information to a photographer. Prior display devices incorporating an illumination display function conventionally light up the illumination display when a lighting switch is depressed. To continue the operation of the illumination display, a timer is started in response to the operation of the lighting switch. The illumination is thereby continued until a predetermined period of time has elapsed.

If the above-mentioned prior display device is built into a camera, the illumination display is generally extinguished during a flash photography or when the camera is set for delayed operation through the use of a timer. Thus, during many camera operations, it is difficult to read out the necessary information due to the non-illumination of the display device as mentioned above. Prior attempts to address this problem have used a switch in order to maintain the illumination of the display device. By operating the switch before initiating flash photography, illumination of the display device is continued. However, this prior attempt to address the problem of continued display illumination creates another problem, namely a risk of exhausting the camera battery through the photographer forgetting to turn off the switch.

SUMMARY OF THE INVENTION

It is therefore an object of the present invention to provide an illuminated display device which will continue illumination during a necessary predetermined time interval.

It is a further object of the present invention to continue illumination of a display device for a predetermined period of time and to extend the illumination beyond the predetermined period of time during an operating mode which exceeds the predetermined period of time.

It is still a further object of the present invention to continue illumination of an illuminated display device when required by an operator and to prevent exhaustion of a power supply through unnecessary illumination of the display device.

Objects of the invention are achieved by providing a display device including a release member, wherein an operating mode is a bulb exposure mode which continues an exposure for a predetermined period of time beginning from receipt of a signal from the release member. A control device continues illumination of an illumination light until the end of the bulb exposure mode. The display device also includes a time exposure mode which continues an exposure for a predetermined period of time beginning from the receipt of a signal from a time release member. The control device continues illumination of the illumination unit until an end of the time exposure mode.

Objects of the present invention are achieved by providing a camera display device having a camera operating mode and a display unit which displays camera operation information. An illumination light, disposed adjacent to the display unit, illuminates the display unit. An illumination switch responsive to an input from a photographer outputs an illumination instruction in response thereto. A control unit responds to the illumination instruction and illuminates the display unit for a predetermined period of time. The control unit detects a continued operation of the camera operating mode and continues illumination of the illumination unit until an end thereof.

Moreover, objects of the invention are achieved by providing a camera display device having an operating mode and including a mode selector switch which selects the camera operating mode from a plurality of operating modes. An instruction unit outputs an illumination instruction and a display unit displays information related to the operation of the camera. An illumination light illuminates the display unit and a timer determines a time period for illumination of the display unit by the illumination light. A control device continues the illumination of the display unit during a predetermined continuation time period in response to the instruction from the instruction unit. The control device also continues the illumination of the display unit by the illumination light until an end of the camera operating mode selected by the mode selector switch. The camera display device also includes a photometric device which determines the luminosity of a subject to be photographed and outputs a signal corresponding thereto. A rangefinding device detects the distance from the camera to a subject to be photographed and outputs a signal corresponding thereto. A control device initiates operation and receives the output signals from the rangefinding device and a photometric device outputs a display signal to the display unit in response thereto. A half depression switch sends a signal to the control device to indicate the performance of photometry and rangefinding. The camera includes a camera lens barrel having a focus position and an exposure control device controlling the amount camera exposure. A photographic lens drive device adjusts the focus position of the camera lens barrel and the control unit outputs information received from the exposure control device. A shutter pointer indicates the time period which has elapsed since the camera shutter has opened until the camera shutter is closed.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
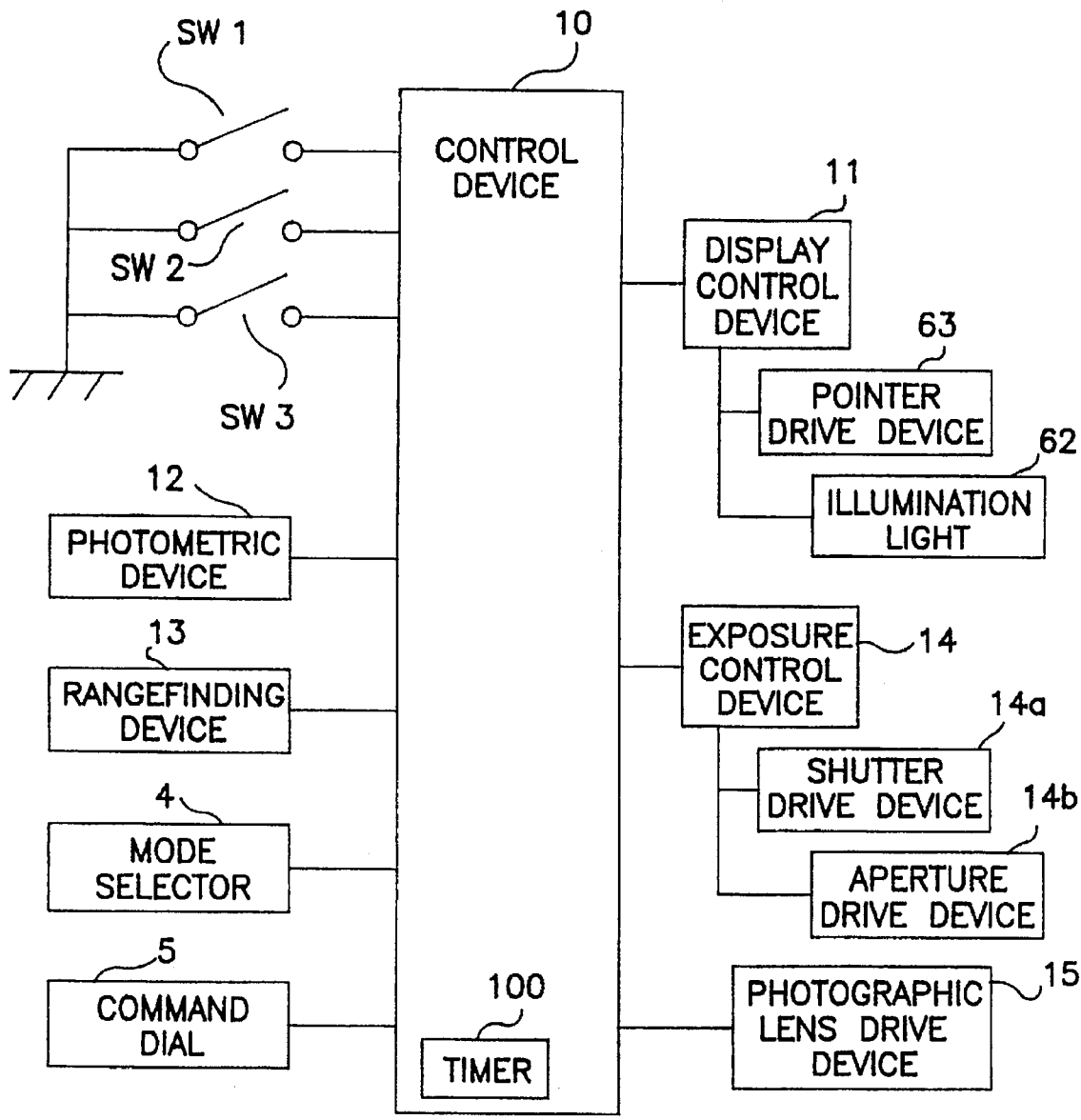
FIG. 1 is a block diagram of a control system of a camera according to a preferred embodiment of the present invention.

Reference will now be made in detail to the present preferred embodiments of the present invention, examples of which are illustrated in the accompanying drawings, wherein like reference numerals refer to like elements throughout.

A preferred embodiment of a display device according to the present invention is described below with reference to FIGS. 1-3, wherein the display device is applied to a camera.

Figure 2:
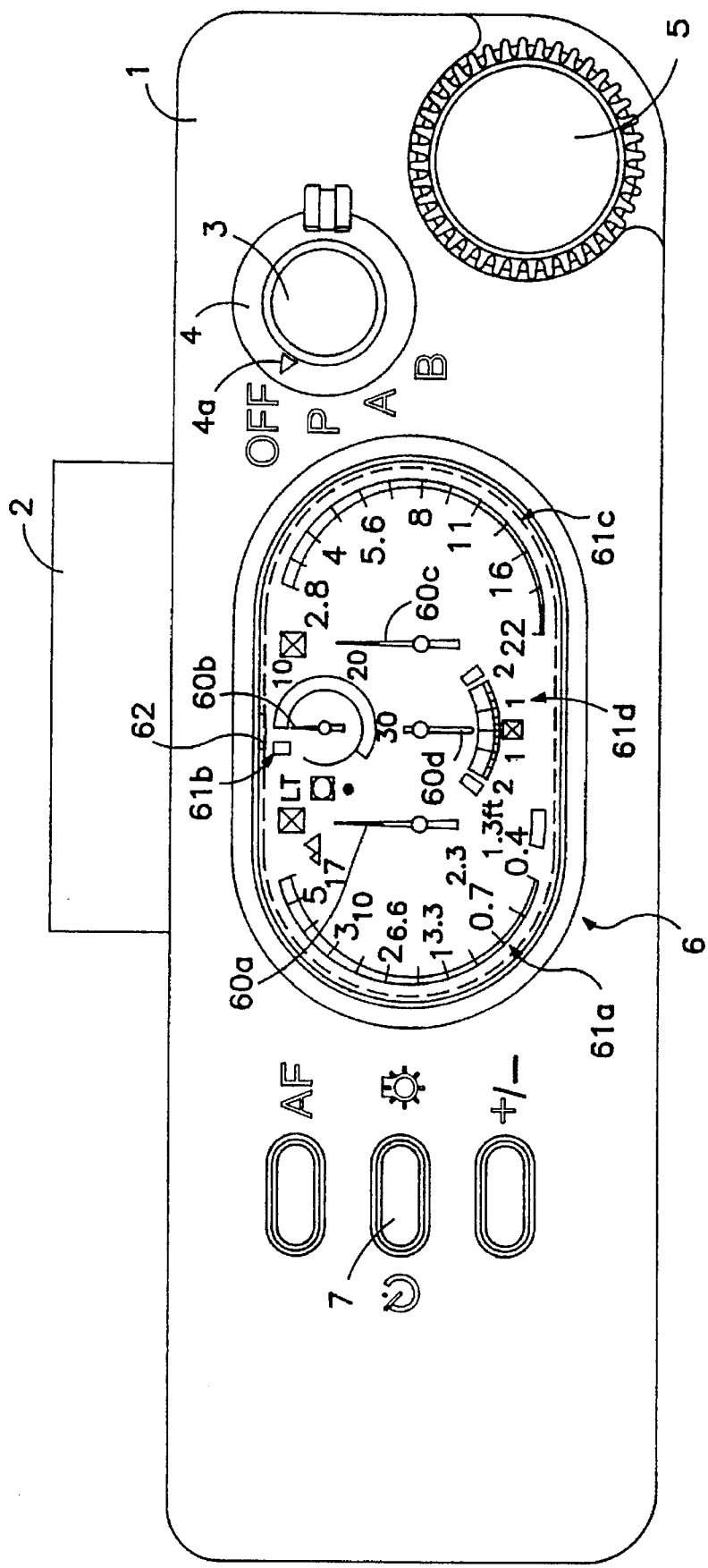
FIG. 2 is a plan view of a camera according to a preferred embodiment of the present invention.

FIG. 1 illustrates schematically the control system of the above-mentioned camera while FIG. 2 illustrates the top surface of a camera having a number of corresponding physical buttons. With reference to FIG. 1 and FIG. 2, control device 10 embodies the various controls necessary for photography, including exposure control. Control device 10 is also provided with a microcomputer, a timer 100 and the peripheral components necessary for operation. A mode selector 4 and a command dial 5 are connected to control device 10. Half depression switch SW1 is turned ON by half depression of release button 3 and release switch SW2 is turned ON by full depression of release button 3. Illumination switch SW3 is turned ON by pressing illumination light button 7. Display control device 11 controls the operation of pointer drive device 63 of display unit 6 and the lighting and extinguishing of illumination light 62. All of these devices are connected to control device 10.

A number of devices necessary for photographic operation are connected to control device 10. These devices include photometric device 12, rangefinding device 13, exposure control device 14 and photographic lens drive device 15. Photometric device 12 detects the luminosity of the subject and outputs a signal corresponding to the detected result. Rangefinding device 13 detects the distance to the subject and also outputs a signal corresponding to the detected result. Exposure control device 14 controls the operation of shutter drive device 14a and aperture drive device 14b according to exposure control signals from control device 10. Photographic lens drive device 15 adjusts the focus position of lens barrel 2, driving it in the optical axis direction. Signals from mode selector 4, showing the selected exposure mode, are output to control device 10.

FIG. 2 is a view of the top surface side of a camera relating to the preferred embodiment. FIG. 2 illustrates camera body 1, lens barrel 2, release button 3, mode selector 4, command dial 5, and display unit 6. Release button 3 has two possible stages of operation. In a first stage of operation, release button 3 is operated to a half depression. In a second stage of operation, release button 3 is depressed further to a full depression. Mode selector 4 is operated by rotation about release button 3 in order to select the exposure control mode. When index pointer 4a of the mode selector 4 points to the index "B", the bulb photography mode is selected. Command dial 5 is rotatably operated in order for the photographer to set the kind of photographic information. Four rotatory pointers 60a–60d are arranged in the display unit 6, while four corresponding index groups 61a–61d are arranged for indicating the respective pointers 60a–60d.

Pointer drive device 63 is, for example, one which rotationally drives pointers 60a–60d by way of stepping motors, actuators, and the like. Details of the display control device of the respective pointers 60a–60d are omitted (as they are known). When in bulb mode, and in order to display the elapsed time of exposure, pointer 60b is rotationally driven in a clockwise direction by predetermined units (for example, 6°/min.). The position shown in FIG. 2 is the standard position, i.e., the position pointing to the top end of the index group 61b.

Illumination light 62 is included at the top center of display unit 6 to illuminate the interior thereof. Illumination light 62 lights up for a predetermined period of time in response to the operation of illumination light button 7. More particular details of the control for illumination light 62 are given below.

Figure 3:
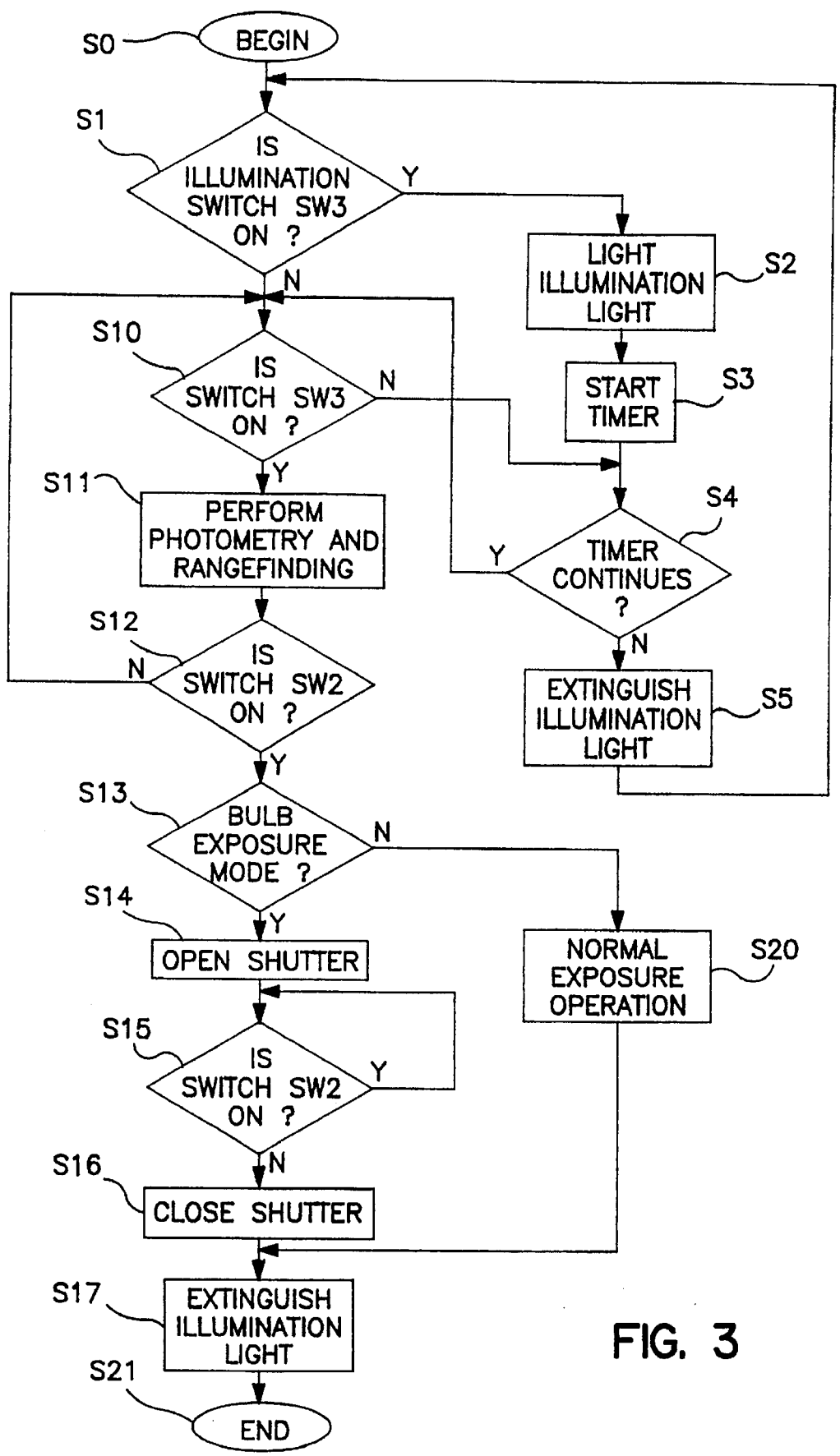
FIG. 3 is a flow chart illustrating the lighting control sequence of the illumination light by a control device for the control system of FIG. 1.

FIG. 3 is a flow chart showing, among the various control programs affected by control device 10, the routine controlling illumination light 62. The process begins in step S0. It is then determined in step S1 whether or not lighting switch SW3 is ON. If switch SW3 is ON, the routine proceeds to step S2 and illumination light 62 is activated. In step S3, the timer 100 (FIG. 1), which is built into control device 10, is started. In the next step, step S4, it is determined whether or not the timer has timed out, i.e., whether the predetermined clock time has elapsed. When the timer has timed out, and is therefore not continuing, the routine proceeds to step S5 wherein the illumination light 62 is extinguished. When illumination switch SW3 is OFF in step S1, or when the timer is continuing in step S4, the routine proceeds to step S10.

In step S10, it is determined whether or not the half depression switch SW1 is ON. If switch SW1 is ON, the routine proceeds to step S11. If switch SW1 is OFF, the routine proceeds to step S4. In step S11, photometry and rangefinding are respectively performed by the photometric device 12 and the rangefinding device 13. It is then determined in step S12 whether or not the release switch SW2 is ON. When the release switch SW2 is OFF, the routine proceeds to step S10. When the release switch SW2 is ON, the routine proceeds to step S13. In step S13, it is determined whether or not the mode is set to the bulb exposure mode, in accordance with a signal from mode selector 4. If the mode is set to the bulb exposure mode, the routine proceeds to step S14 and the shutter is caused to open. In step S15, it is determined whether or not the release switch SW2 is ON. If switch SW2 is ON, the same determination is repeated. If switch SW2 is OFF, the routine proceeds to step S16 and the shutter is closed. The time which has elapsed from the opening of the shutter is indicated by way of pointer 60b. After closing the shutter, illumination light 62 is extinguished in step S17 and the routine ends in step S21. When the mode selected in step S13 is not the bulb exposure mode, the routine proceeds to step S20 and normal exposure operation is performed. Next, the routine proceeds to step S17. During normal exposure operation, the shutter and aperture are controlled according to the shutter speed and aperture value set by the camera or by the photographer.

By way of the above process, when illumination light button 7 is pressed, illumination light 62 is illuminated continuously for a predetermined period of time according to steps S1–S5. When release button 3 is half-way depressed during the lighting of illumination light 62, the routine proceeds to step S11 and the steps following therefrom. When release button 3 is fully depressed, the exposure operation is started. After the exposure operation has been completed, illumination light 62 is extinguished in step S17. Thus, through the present embodiment, while an exposure operation is initiated and illumination light 62 is lit, the illumination of light 62 is continued until the exposure operation, by way of processes according to steps S10–S20, has ended. After the exposure operation has ended, illumination light 62 is automatically extinguished. Accordingly, even if the continuation time of bulb exposure (steps S14–S15) or of normal exposure (step S20) requires a longer time period than the clock time period of the timer in step S4, illumination light 62 is not extinguished during exposure.

An extra step which is similar to step S17 may be added before step S20 as a process for causing illumination light 62 to extinguish. In this case, because illumination light 62 is extinguished in advance of the photographic operation, energy from the battery is conserved.

As described herein above, illumination of the display device is continued by way of the above-mentioned illumination extension until an operation mode ends. Thus, there is no risk of a failure to read out the necessary information due to the ending of illumination during the operating mode. Further, it is not necessary to perform an additional operation in order to restart illumination during a predetermined operating mode. In particular, when the above-mentioned embodiment of the display device is applied to a camera, interruption of illumination during an extended exposure mode, bulb exposure mode, or time exposure mode is prevented. A dedicated switch and corresponding operation to resume the illumination is thus unnecessary. Through photographic operation in accordance with the above embodiment, a risk of photographic image blur may be prevented through proper setting of the control information. Further, since the illumination continues only until the operation mode ends, there is no unnecessary consumption of battery power due to the potential of forgetting to turn OFF the switch.

Operation of the display device of the above-mentioned embodiment is attained by the provision of display unit 6, which displays information relating to the operation of the apparatus and illumination light 62, for illumination thereof. Illumination light button 7 is an instruction unit and initiates operation of the illumination by sending an instruction to control device 10. Continued illumination of display unit 6 is then maintained by way of illumination light 62, which is an illumination unit, for a predetermined period of time in response to the illumination light button 7. Thus, even if the above-mentioned predetermined time period has elapsed, control device 10 continues the illumination of display device 6 until the end of the current operating mode through illumination light 62.

When illumination light button 7 is depressed, control device 10 causes display device 6 to become illuminated for a predetermined period of time. However, if the apparatus, such as a camera, is in an operating mode which continues for a longer period of time than the above-mentioned predetermined continuation time, the illumination is continued by way of control device 10, in the form of an illumination extension unit, until the operating mode ends.

According to an embodiment of the present invention, display device 6 displays information of the camera while illumination light 62 provides illumination therefor. Illumination light button 7 commences illumination of illumination light 62 while control device 10, as an illumination continuation unit, continues the illumination of display device 6. The illumination of display device 6 is accomplished by way of illumination light 62 for a predetermined period of time in response to illumination light button 7. The illumination extension unit is disposed such that during continuation of the exposure operation, the lighting continues until a predetermined period of time has elapsed. In other words, the illumination of display unit 6 by illumination light 62 is continued until the exposure operation of the camera is complete.

Control device 10, is arranged to cause continuation of the illumination of display device 6. This is accomplished by way of illumination light 62 until the end of the current operating mode. Control device 10 continues the illumination even though the above-mentioned predetermined continuation time has elapsed. Control device 10 may optionally be formed of a separate illumination continuation unit and illumination extension unit.

Referring now to the above-mentioned operating mode, various exposure modes may continue exposure during a time period which is greater than the aforementioned predetermined continuation time. For example, a bulb exposure mode continues an exposure from an operation of release member 3 until the operation is discontinued. An example of another exposure mode is a time exposure mode in which the mode of operation commences in response to the operation of release member 3 and which ends the exposure in response to the release of release member 3. The selected operating mode may continue for a longer time than the illumination continuation time, due to control device 10. For example, by way of a long time exposure mode, bulb exposure mode or time exposure mode, the illumination is continued by way of control device 10 until the ending of the operating mode. Because the illumination of display unit 6 continues until the end of the photographic operation of the camera, it is not necessary to perform a switch operation which resumes illumination during an exposure. Thus, a risk of camera image blur can be prevented.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A display device for an apparatus having a bulb and a selectable bulb exposure mode of operation with a beginning and an end, said display device comprising:

a timer which operates to determine a first period of time;

a display unit which displays illuminated information related to the operation of the apparatus during the first period of time; and an illumination extension unit which continues illumination of the display unit for a second period of time beyond the first period of time until the end of the bulb exposure mode of operation in response to selection of the bulb exposure mode of operation.

2. The display device according to claim 1, wherein the apparatus is a camera and the display device has a long photographic exposure mode which continues the photographic exposure longer than the first period of time, and the illumination extension unit continues illumination of the display unit until the end of the long exposure mode.

3. The display device according to claim 1, wherein the apparatus is a camera, said display device further comprising:

a release member providing a signal in response to release thereof, wherein the bulb exposure mode continues the bulb exposure for the second period of time beginning from receipt of the signal from the release member.

4. The display device according to claim 1, wherein the apparatus is a camera and the display device has a time exposure mode for taking time exposure photography, said display device further comprising:

a time release member providing a signal in response to release thereof, wherein the time exposure mode continues an exposure for a predetermined period of time beginning from receipt of the signal from the time release member, and the illumination extension unit continues illumination of the display unit until the end of the time exposure mode.

5. The display device according to claim 1, further comprising:

a mode selector switch which selects the bulb exposure mode of operation from a plurality of operating modes.

6. A display device for a camera having a selectable bulb exposure mode comprising:
   a display unit which displays camera operation information;
   an illumination light illuminating said display unit;
   an illumination switch responsive to an input from a photographer and outputting an illumination instruction in response thereto;
   a timer which operates to determine a predetermined period of time in response to the illumination instruction; and
   a control device responsive to the illumination instruction and illuminating said illumination light during the predetermined period of time, wherein said control device detects selection of the bulb exposure mode and continues illumination of the illumination light beyond the predetermined period of time until an end of the bulb exposure mode.

7. The camera display device according to claim 6, wherein the display device has a long exposure mode having a beginning and an end which continues an exposure longer than the predetermined period of time determined by the timer, and the control device continues illumination of the illumination light until the end of the long exposure mode.

8. The camera display device according to claim 6, said camera having a bulb release member providing a signal in response to release thereof, wherein the bulb exposure mode continues an exposure beginning from receipt of the signal from the release member and ending after a second predetermined period of time.

9. The camera display device according to claim 6, said camera having a time release member providing a signal in response to release thereof, wherein said display device has a time exposure mode which continues an exposure beginning from receipt of the signal from the time release member and ending after a second predetermined period of time, and the control device continues illumination of the illumination light until the end of the time exposure mode.

10. A camera display device for a camera comprising:
   a mode selector switch which selects a bulb exposure mode having a beginning and an end from a plurality of operating modes;
   an instruction unit which outputs an illumination instruction;
   a display unit which displays information related to the operation of the camera;
   an illumination light which illuminates the display unit;
   a timer which determines a predetermined time period for illumination of the illumination light;
   a control device which continues illumination of the illumination light during the predetermined time period in response to the illumination instruction from the instruction unit and continues illumination of the illumination light until the end of the bulb exposure mode selected by the mode selector switch.

11. The camera display device according to claim 10 wherein the mode selector switch selects a long exposure mode which continues an exposure longer than said predetermined time period for illumination by said illumination light, and the control device continues illumination of the illumination light until the end of the long exposure mode.

12. The camera display device according to claim 10, said camera having a bulb release member providing a signal in response to release thereof, wherein the bulb exposure mode continues an exposure for a predetermined period of time beginning from receipt of the signal from the release member.

13. The camera display device according to claim 10, said camera having a time release member providing a signal in response to release thereof, wherein the mode selector switch selects a time exposure mode which continues an exposure for a predetermined period of time beginning from receipt of the signal from the time release member and the control device continues illumination of the illumination light until the end of the time exposure mode.

14. The camera display device according to claim 10 further comprising:
   a photometric device which determines the luminosity of a subject to be photographed and outputs a signal corresponding thereto;
   a rangefinding device which detects the distance from the camera to a subject to be photographed and outputs a signal corresponding thereto; and
   a half depression switch which outputs a signal to initiate performance of photometry and rangefinding;
   wherein the control device initiates operation and outputs a display signal to the display unit in response to the output signal from the half depression switch.

15. The camera display device according to claim 10, wherein said camera includes a camera lens barrel having a focus position, said display device further comprising:
   an exposure control device which controls the amount of camera exposure; and
   a photographic lens drive device which adjusts the focus position of the camera lens barrel;
   wherein the control device outputs information received from the exposure control device and the photographic lens drive device to the display unit.

16. The camera display device according to claim 10, wherein said camera has a camera shutter and said display unit includes a shutter pointer which indicates the time period that has elapsed since the camera shutter has opened until the camera shutter is closed.

17. A display device for a camera having a bulb for providing bulb exposure and having a mode of operation with a beginning and an end, said display device comprising:
   a display unit which displays illuminated information related to camera operation for a predetermined period of time;
   an illumination extension unit which selectively continues illumination of the display unit beyond the predetermined period of time until the end of the mode of operation; and
   a release member providing a signal in response to release thereof;
   wherein the mode of operation is a bulb exposure mode which continues the bulb exposure for a predetermined period of time beginning from receipt of the signal from the release member, and the illumination extension unit continues illumination of the display until the end of the bulb exposure mode.

18. A display device for a camera providing time exposure photography and having a mode of operation with a beginning and an end, said display device comprising:
   a display unit which displays illuminated information related to camera operation for a predetermined period of time;
   an illumination extension unit which selectively continues illumination of the display unit beyond the predetermined period of time until the end of the mode of operation; and
   a time release member providing a signal in response to release thereof;

wherein the mode of operation is a time exposure mode which continues an exposure for a predetermined period of time beginning from receipt of the signal from the time release member, and the illumination extension unit continues illumination of the display unit until the end of the time exposure mode.

19. A display device for a camera having an operating mode and a bulb release member providing a signal in response to release thereof, comprising:

a display unit which displays camera operation information;

an illumination light illuminating the display unit;

an illumination switch responsive to an input from a photographer and outputting an illumination instruction in response thereto; and a control device responsive to the illumination instruction and illuminating said illumination light for a predetermined period of time in response thereto, and which detects the continued operation of the camera operating mode to continue illumination of the illumination light beyond the predetermined period of time until an end of the operating mode;

wherein the operating mode is a bulb exposure mode which continues an exposure beginning from receipt of the signal from the release member and ending after a predetermined period of time, and the control device continues illumination of the illumination light until the end of the bulb exposure mode.

20. A camera display device for a camera comprising:

a mode selector switch which selects a camera operating mode having a beginning and an end from a plurality of operating modes;

an instruction unit which outputs an illumination instruction;

a display unit which displays information related to the operation of the camera;

an illumination light which illuminates the display unit;

a timer which determines a predetermined time period for illumination of the illumination light; and a control device which continues illumination of the illumination light during the predetermined time period in response to the illumination instruction from the instruction unit and continues illumination of the illumination light until the end of the camera operating mode selected by the mode selector switch;

wherein the operating mode selected by the mode selector switch is a long exposure mode which continues an exposure longer than said predetermined time period for illumination by said illumination light, and the control device continues illumination of the illumination light until the end of the long exposure mode.

21. A camera display device for a camera comprising:

a mode selector switch which selects a camera operating mode having a beginning and an end from a plurality of operating modes;

an instruction unit which outputs an illumination instruction;

a display unit which displays information related to the operation of the camera;

an illumination light which illuminates the display unit;

a timer which determines a predetermined time period for illumination of the illumination light;

a control device which continues illumination of the illumination light during the predetermined time period in response to the illumination instruction from the instruction unit and continues illumination of the illumination light until the end of the camera operating mode selected by the mode selector switch; and a bulb release member providing a signal in response to release thereof, wherein the operating mode selected by the mode selector switch is a bulb exposure mode which continues an exposure for a predetermined period of time beginning from receipt of the signal from the release member, and the control device continues illumination of the illumination light until the end of the bulb exposure mode.

* * * * *